Dec. 11, 1934.  C. N. BARTON  1,983,893

EGG PACKING APPARATUS

Filed Oct. 23, 1933  3 Sheets—Sheet 1

Inventor:
Charles N. Barton.
per *[signature]*
Attorneys

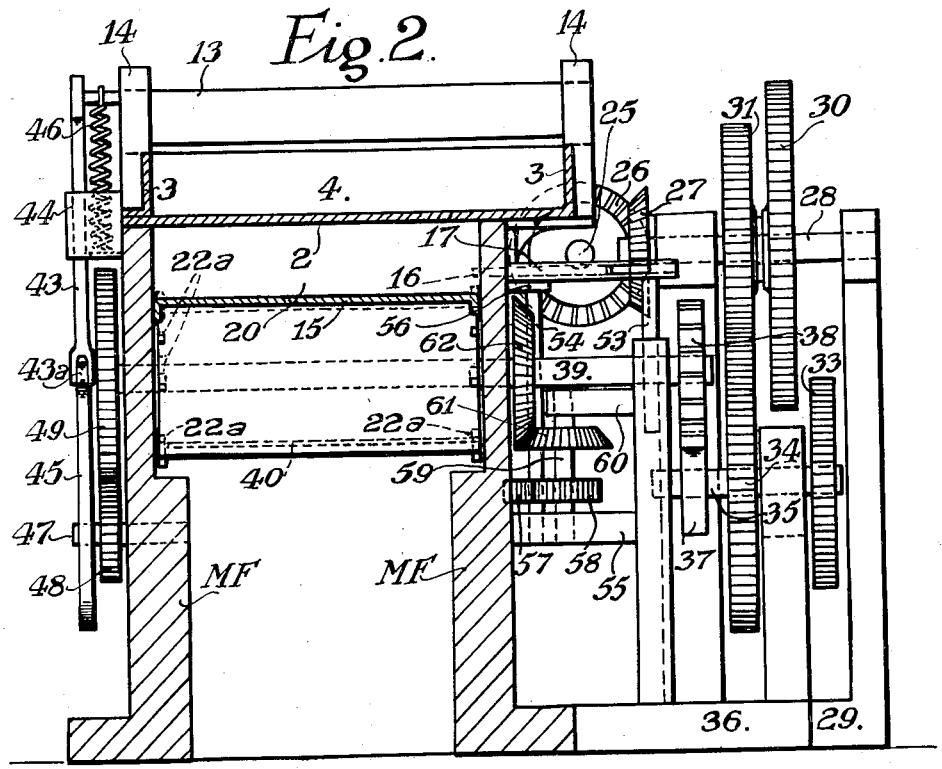

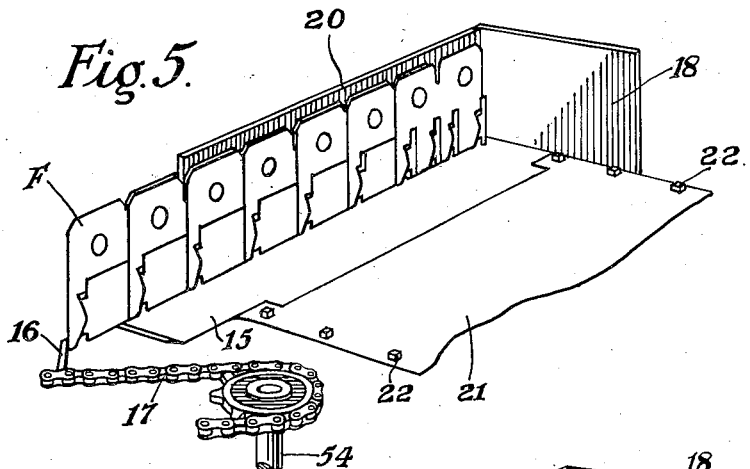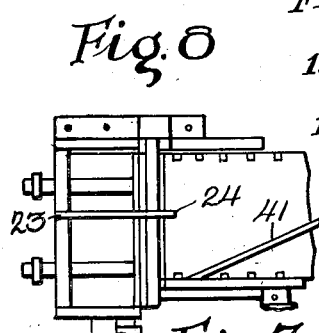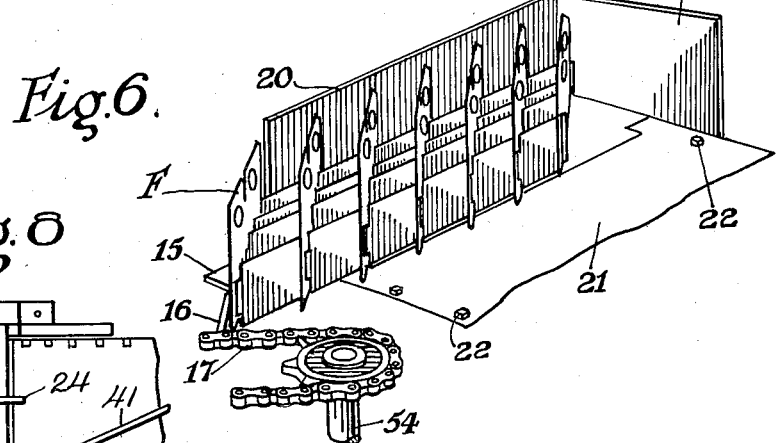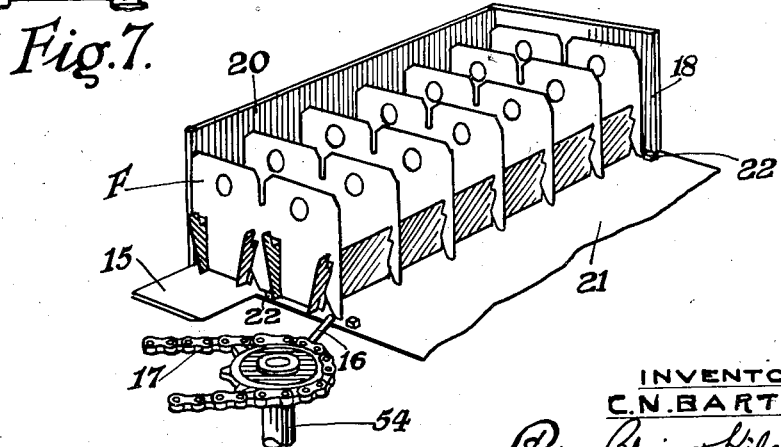

Patented Dec. 11, 1934

1,983,893

UNITED STATES PATENT OFFICE 1,983,893

EGG PACKING APPARATUS

Charles Nathaniel Barton, Wimbledon, London, England

Application October 23, 1933, Serial No. 694,849
In Great Britain October 3, 1932

7 Claims. (Cl. 226—14)

This invention relates to improvements in or connected with egg-packing apparatus and has for its object, inter alia, to provide means whereby eggs may be automatically packed in fillers of the collapsible kind and is particularly, though not necessarily exclusively, intended for use in conjunction with the egg feeding and grading apparatus forming the subject of my co-pending application, Serial No. 694,848, filed October 23, 1932, of even date entitled "Improvements in egg-grading and packing apparatus."

One of the objects of the present invention is to provide a machine including means for supporting a plurality of collapsed fillers and means for opening and feeding said fillers automatically into positions for receiving eggs.

Another object is to provide a machine capable of opening collapsed fillers and feeding the opened fillers singly under egg feeding or grading and feeding mechanism.

A further object is to provide a machine which opens and feeds fillers into positions for receiving eggs, for instance from a mechanically controlled feeding or feeding-and-grading mechanism, and then conveys the loaded fillers to a packing or discharge station.

A still further object of the present invention is to provide positive means for conveying the opened fillers into desired positions for receiving eggs.

Yet another object is to provide filler extending and feeding mechanism which is operated automatically by and in synchronism with egg feeding or egg feeding and grading mechanism for example such as is described in my co-pending application of even date entitled "improvements in egg-grading and packing apparatus."

With the above and other objects in view the present invention resides in the combination and co-operation of parts hereinafter described and claimed in the appended claims.

In carrying out the present invention operation of the means for opening the fillers and feeding said opened fillers is preferably effected automatically by the egg-feeding mechanism and in a step by step motion so that at one discharge cycle of the egg feeding mechanism a complete line of cells in the filler may be filled simultaneously.

The aforesaid egg-fillers when collapsed may be stacked on edge on a tray, platform or the like and they may be fed singly from said tray or the like by being passed through a slot in the base thereof adjacent to the front end. In this arrangement the stacked fillers may be fed towards the front of the tray by means of a weight or spring controlled follower, and the front filler may be fed through the slot in the base by means of a vertically reciprocating plunger. The operation of this plunger is preferably effected in such a way that as soon as one filler has been filled another one is automatically ejected.

The means for expanding the collapsed fillers may conveniently consist of one or more endless bands carrying striking fingers or the like adapted to engage the front edge of the filler and swing it outwardly from the body of the filler, thereby opening the cells or compartments thereof and this movement is preferably adapted also to feed the filler on a conveyor band which may be provided with projections, studs or the like for positively supporting and spacing the fillers as they are positioned thereon.

This invention is preferably used in combination with the egg-grading apparatus described in my aforesaid co-pending application entitled "Improvements in egg-grading and packing apparatus," and in such cases the direction of travel of the band conveying the fillers is preferably at right angles to the direction of travel of the partitions along the container referred to in the above mentioned specification. In this way the filler only has to be moved a distance equal to the width of one row of compartments between the operations of stacking each row of said compartments.

In order that the invention may be more clearly understood reference will now be made to the accompanying drawings which show, by way of example only, one embodiment thereof in application to egg grading apparatus which may for example be similar to that forming the subject of my aforesaid co-pending application.

In the drawings:—

Figure 2 is a section on the line 11—11 of Fig. 1,

Figure 3 is a section on the line 111—111 of Fig. 1 with parts broken away or removed for clearness.

Figures 5, 6 and 7 are detail perspective views showing succeeding stages in the opening of a filler.

Figure 8 is a diagrammatic plan view showing a modification of the structure shown in Figure 1 adapted to be used with fillers of smaller size.

Figure 1:
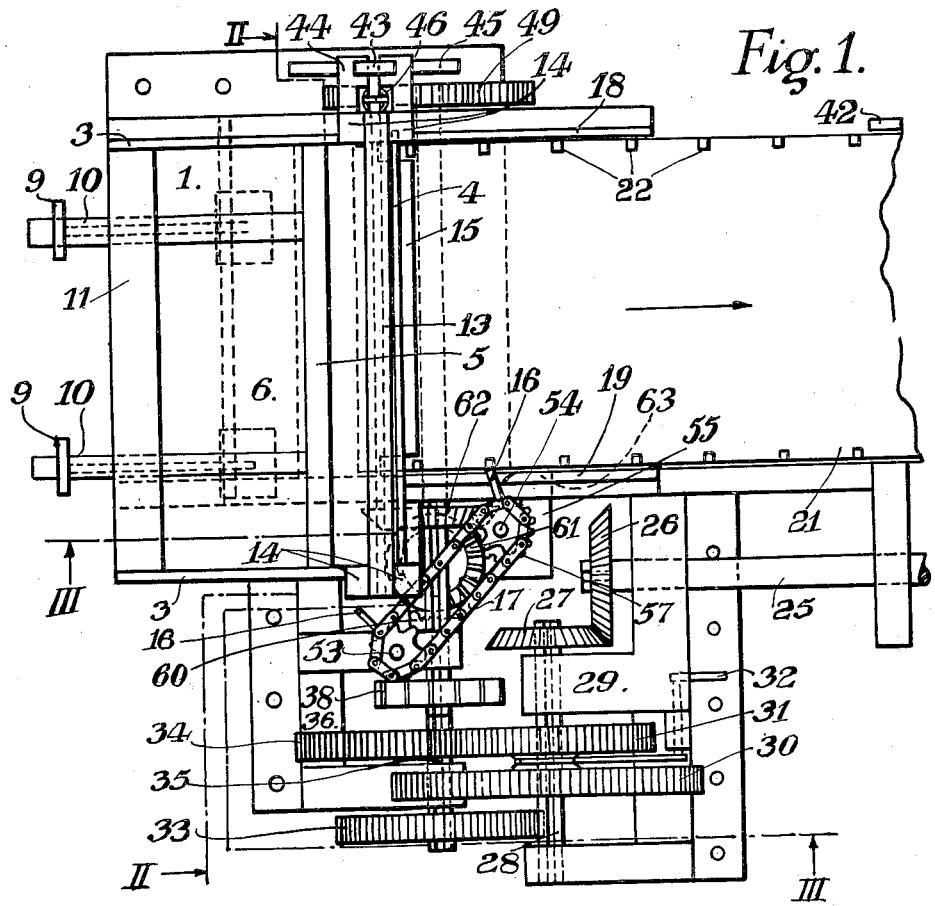
Figure 1 is a plan view of the machine.

In the example illustrated the machine includes a magazine 1 for supporting the collapsed fillers F. the magazine consisting of a base 2, side members 3, and at the front a stop plate 4 against which the collapsed fillers are urged by a follower or pusher plate 5 bearing against the back of the fillers under the action of weights 6 connected by cords 7, running over pulleys 8, to the eyes of pins 9 fixed to the outer ends of rods 10 which project from the plate 5 and are mounted in guides conveniently constituted by the rear member 11 connecting the sides 3 of the magazine. It will be noted that with this construction a constant pressure is exerted on the collapsed fillers in the magazine irrespective of the number of fillers therein.

Adjacent the stop plate 4 is a throat 12 through which the collapsed fillers are ejected singly by means of a plunger 13 which reciprocates vertically in guide supports 14. The fillers are ejected on to a plate 15 which is secured to the side walls of the frame MF supporting the magazine 1, and are then opened out by fingers 16 secured to an endless conveyor 17 which in moving causes a finger 16 to engage the edge of an ejected filler which filler abuts against the plate 18 of a pair of guide plates 18 and 19 and also against a rear plate 20 and so turns about itself into the expanded position as shown in Figs. 5, 6 and 7 with the front edge thereof engaging a conveyor 21—hereinafter termed the filler conveyor which feeds each filler in turn to the egg receiving position of the grading apparatus.

Conveniently, the filler conveyor is provided with projections or chocks 22 at each side which positively engage the edges of the expanded fillers for transporting them and at the same time properly spacing each succeeding filler from the preceding one.

Preferably, in order to eliminate the possibility of slip which might effect the timing of the apparatus, a positive drive is provided for the filler conveyor. To this end, the drive may be effected through a chain and sprocket, the belt which carries the fillers being attached to the chain, or the chocks 22 may be extended inwardly as shown, particularly in Figs. 3 and 4, to engage in slots 22a arranged around the two sides of the driving chain 40 of the conveyor.

The magazine as shown is made to take the standard size of filler having two rows of six cells and may be adapted for use with the smaller capacity filler having two rows of three cells by insertion of a partition 23 as disclosed in the modification shown in Fig. 8 the rear member 11 and the pusher plate being slotted to take this auxiliary plate as will be readily understood, and an auxiliary guide plate 24 being made for attachment to the stop plate 4, so as to act as the abutment when expanding the fillers by the fingers 16.

As hereinbefore stated, the apparatus being described is particularly adapted for use with the grading apparatus according to my co-pending application of even date and entitled "Improvements in egg-grading and packing apparatus," and it will be understood that there will be a separate filler equipment for each grading section. In order to operate the filler equipment in synchronism with the aforesaid grading apparatus so that as eggs are discharged from the container EC of that apparatus, the rows of cells of the fillers are brought in turn underneath the container and the collapsed fillers are fed from the magazine and opened out for transportation on the filler conveyor to the container, the mechanism now about to be described may be employed.

The mechanism includes a shaft 25 which is connected conveniently by being integral with the shaft 65 of the partition conveyor of the grading apparatus and rotates each time the partition conveyor operates, that is, each time the container EC receives an egg.

On the shaft 25 is mounted a bevel wheel 26 which gears with a second bevel wheel 27 fixed on a shaft 28 rotably mounted on supports 29 constituting part of the frame MF. Slidably mounted on the shaft 28 is a pair of change speed wheels 30 and 31 which may be slidden by means of a gear lever 32 slidably mounted on the support 29. The wheels 30 and 31 are adapted to be engaged with a corresponding pair of toothed wheels 33 and 34 secured to a shaft 35 which is mounted in bearings in supports 36 and is provided at its end with a pawl 37 of a Geneva stop device of which the wheel 38 is fixed to a drive shaft 39 on which is carried the driving drum 40 for the filler conveyor 21 which corresponds to that numbered 36 in the aforesaid co-pending application.

The timing of the mechanism is conveniently arranged so that the filler conveyor is moved on the first step of the aforesaid partition conveyor after the eggs in the container EC have been discharged, and the mechanism is adapted by means of the change speed gears 30 and 31 to function for use with the twelve or six capacity fillers having respectively six or three cells in a row.

Accordingly, when the change speed wheel 31 is gearing with the wheel 34, after six steps of the said partition conveyor, i. e. when the sixth egg is to be received thereby, the Geneva pawl 37 through the gearing just described will be positioned ready to engage one of the teeth of the wheel 38, whereupon on the seventh step of the partition conveyor the wheel 38 is rotated one tooth to cause the filler conveyor to move one step to bring the next row of cells under the aforesaid container EC.

On the other hand, if the change speed wheels are moved so that the wheel 31 is disengaged and the wheel 30 is engaged with the corresponding wheel 33, then on the fourth step of the said partition conveyor, the filler conveyor 21 will be moved. In this case the apparatus will be feeding the smaller capacity filler, and so that the fillers after being ejected from the magazine and expanded, may be brought on to the further side of the filler conveyor in order to be positioned under the first three compartments of the container EC of the grading apparatus, there will be inserted in the path of the fillers a deflecting plate 41 which may be attached to the other guide plate 19 and causes the fillers to be moved across the filler conveyor as the latter operates. On this further side of the filler conveyor there will be a guide plate 42 which by engaging the leading edge of a filler turns the traversing fillers back into the straight path.

These guide and deflecting plates 41 and 42 are necessary when the filler equipment is associated with the grading apparatus as shown in the aforesaid co-pending application, but if the direction of travel in that grading apparatus is reversed then the deflecting plates will not be necessary, as the fillers will be required to be fed along the near side of the filler conveyor.

In some cases, however, by disposing the driving mechanism for the filler conveyor and the conveyor 17 carrying the fingers 16, on the opposite side to that shown, the deflecting plates could in this particular application of the invention be eliminated. In such a construction the shaft 25 would be connected to the shaft 57 of the partition conveyor of the grading apparatus.

As there are two rows of cells to each filler, a new filler will be required to be fed from the magazine for each two steps of the filler conveyor. To this end there is secured to the plunger 13 a rod 43 which slides in guides 44 and is provided at its lower end with a roller 43a which engages a cam 45 under the action of a spring 46. The cam 45 is secured to a shaft 47 rotatably mounted in the frame MF. On the shaft 47 is fixed a toothed wheel 48 which gears with a toothed wheel 49 mounted on the filler conveyor drive shaft 39.

Figure 4:
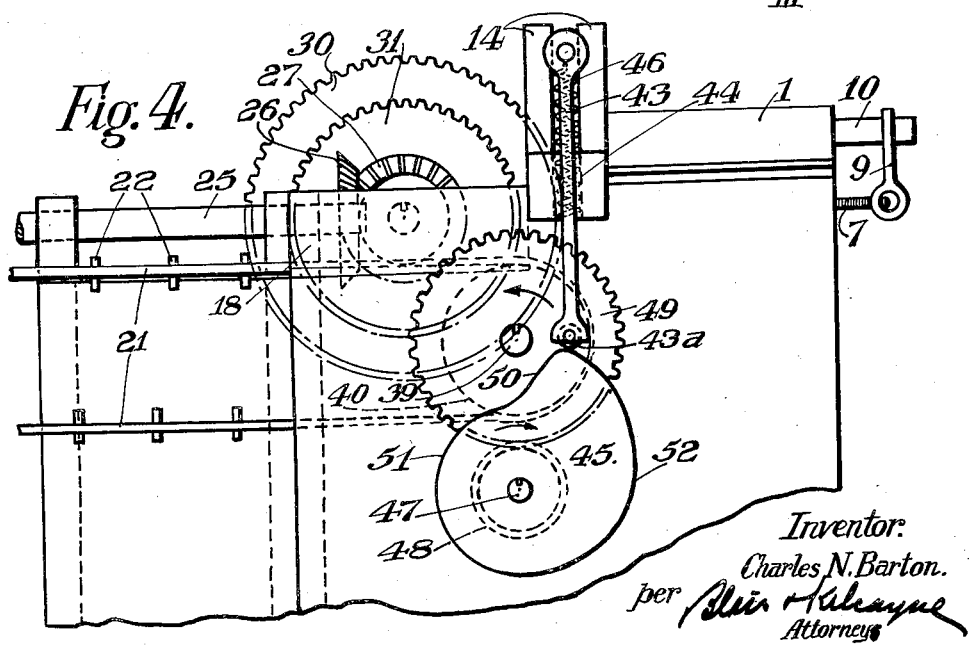
Figure 4 is an elevation from the opposite side of the filler conveyor to that shown in Fig. 3.

In the position of the parts as shown in Figs. 2 and 4, the plunger 13 is at the top of its stroke ready to feed a collapsed filler from the magazine. On the first step of the filler conveyor, the plunger 13 will immediately descend due to the roller 43a running down the incline 50 of the cam 45 under the action of the spring 46. Thus, one filler will be ejected on to the plate 15 ready for opening by a finger 16. During the remainder of the step, while the ejected filler is being opened, the roller will run on the concentric part 51 of the cam, thus keeping the plunger in the lower position. At the end of the step, the roller 43a will stop just at the beginning of the rise 52 of the cam 45 so that on the next step of the filler conveyor the roller rides up the rise 52 and restores the plunger to the upper position shown in Figs. 2 and 4.

The plunger therefore descends and feeds a filler from the magazine once every two steps of the filler conveyor and accordingly at every two discharge operations from the container of the grading apparatus, the ejected filler—which is opened out during that step wherein and immediately after the plunger descends—being carried forward by the filler conveyor on the following step thereof in which the plunger is restored to the upper position.

Movement of the conveyor 17 carrying the fingers 16 is effected intermittently in synchronism with the movements of the filler conveyor and the timing is such that the plunger 13 descends to eject a filler before a finger reaches a position wherein it can engage the ejected filler, a certain amount of idle movement being provided for this purpose as will be clearly seen from Fig. 1.

The sprockets of the finger conveyor 17 are carried on shafts 53 and 54, of which the shaft 54 rotates in bearings in a cross support 55 and in a flange 56 of the frame MF, while the shaft 53 is rotatably mounted on the support 36. On the shaft 54 is fixed a toothed wheel 57 which gears with a toothed wheel 58 secured to a shaft 59 which is rotatably mounted in the cross support 55 and in a projection 60 of the support 36. The shaft 59 also carries a bevel wheel 61 which in turn gears with a bevel wheel 62 fixed to the drive shaft 39 of the filler conveyor.

Thus, each time the drive shaft 39 is rotated the finger conveyor 17 is moved so as to cause a finger 16, when the parts are as shown in Fig. 1 to travel from the left to the right hand end thereof and in so doing engage an ejected filler to open it as hereinbefore described, Fig. 3 showing the filler after it has been opened out with the plunger 13 in the lower position. During the upward stroke of the plunger the fingers 16 will come back to the position of Fig. 1.

It will be noted that the guide plate 19 at the side of the filler conveyor is provided with a slot 63 which permits the fingers to pass the guide plate during their movement with the finger conveyor 17.

The following summary gives the operations involved in feeding fillers one by one from the magazine on to the filler conveyor for transportation to the grading apparatus:—

1. Shaft 25 rotates as each egg is graded.
2. Geneva cam pawl 37 rotates either one-seventh or one-quarter of a revolution according to the position of the change speed wheels 30 and 31, and on the seventh or fourth step the Geneva cam wheel 38 will operate the filler conveyor 21 one step to bring the next row of cells under the container of the grading apparatus.
3. At every two steps of the filler conveyor, plunger 13 descends, first, to eject a collapsed filler from the magazine 1, and then the ejected filler is expanded or opened out by a finger 16.
4. On the following step of the filler conveyor 21 the expanded filler is carried forward and the plunger rises ready for the next feeding operation which will occur on the next step of the filler conveyor.

In order to feed the fillers independently of the grading apparatus, such as when initially starting up the machine, the shaft 25 may be connected through a clutch connection to a suitable source of power, which may be disconnected immediately the first row of cells comes underneath the container of the grading apparatus.

In the above described equipment a separate filler feeding machine is provided for feeding fillers to each point at which the graded eggs are discharged, i. e. each machine feeds fillers for only one grade of eggs.

Whilst I have hereinbefore given one example of apparatus according to my invention, I wish it to be understood that the particular details and arrangement of parts may be varied or modified without departing from the scope thereof. Thus for instance the apparatus may be adapted to deal with any desired number of eggs, the fillers employed may be of any required capacity, and although the equipment has been above described as being used for packing graded eggs, it may of course be used for packing ungraded eggs if desired.

I claim:—

1. Apparatus for feeding collapsible fillers into positions for receiving eggs, comprising a magazine for receiving collapsed fillers, means for ejecting said fillers singly on to a platform, a conveyor band for conveying said fillers from said platform into positions for receiving the desired eggs and means for expanding said collapsed fillers and transferring them from said platform on to said conveyor, said means comprising an endless band having projections moving in the plane of the platform and so disposed that during their movement they engage the forward edge of the filler concerned and move it in a direction causing the filler to expand and to rest upon the conveyor.

2. Apparatus for feeding collapsible fillers into positions for receiving eggs, comprising a magazine for storing collapsed fillers, means for ejecting said fillers singly from said magazine, means for expanding each filler when it has been ejected, a conveyor for feeding each expanded filler away from said expanding means, a main drive shaft and power transmission gearing between said main drive and said filler ejecting, expanding and feeding means, said gearing causing intermittent operation of said filler feeding means and said filler ejecting means being operated automatically by each second movement of said feeding means.

3. Means for feeding collapsible fillers into positions for receiving eggs, comprising a magazine for storing collapsed fillers, means for ejecting said fillers singly from said magazine, means for expanding each filler when it has been ejected from said magazine, a conveyor for feeding each expanded filler from said expanding means into a position for receiving the desired eggs and a main drive shaft rotated in a step-by-step manner for operating said filler ejecting, expanding and feeding means, said main drive shaft being rotated one step each time an egg is located in position for transference to the filler, said filler conveyor being operated one step each time one row of cells in said filler is loaded with eggs, and said filler ejecting means being operated automatically at each second movement of the filler conveyor.

4. Apparatus for feeding collapsible fillers into positions for receiving eggs, comprising a magazine for receiving collapsed fillers, an aperture in the base of said magazine, a vertically movable plunger located over said aperture, means for reciprocating said plunger to eject said fillers singly therethrough, a platform for receiving each ejected filler, means for conveying said fillers from said platform into positions for receiving the desired eggs, and an endless band having projections moving in the plane of the platform and so disposed that during their movement they engage the forward edge of the filler concerned and move it in a direction causing the filler to expand and to rest upon the conveyor.

5. Apparatus for filling collapsible fillers into positions for receiving eggs, comprising a magazine for storing collapsed fillers, an aperture in the base of said magazine, a vertically movable plunger located over said aperture, means for reciprocating said plunger to eject said fillers singly from said magazine through said aperture, a platform for receiving the ejected fillers, a conveyor band for conveying said fillers from said platform into positions for receiving the desired eggs, an endless band having projections moving in the plane of the platform and so disposed that during their movement they engage the forward edge of the filler to expand and rest upon the conveyor band, a main drive shaft and transmission gearing between said filler ejecting, expanding and conveying means whereby said conveying means is operated one step each time one row of cells in said filler is loaded with eggs and said filler ejecting means is operated upon each second movement of the said conveying means.

6. Apparatus for feeding collapsible fillers into positions for receiving eggs, comprising a magazine for receiving collapsed fillers stacked on their edges, an aperture in the base of said magazine, a vertically movable plunger located over said aperture, means for reciprocating said plunger to eject said fillers singly through said aperture, a platform for receiving each ejected filler, means for expanding each filler as it rests on said platform, a conveyor for feeding said expanded fillers into positions for receiving the desired eggs, a main drive shaft and power transmission gearing between said shaft and said filler ejecting, expanding and conveying means, said gearing causing intermittent operation of said conveying means and said filler ejecting means being operated at every second movement of said conveying means.

7. Apparatus for feeding collapsed fillers into positions for receiving eggs, comprising a magazine for receiving collapsed fillers, means for ejecting said fillers singly on to a platform, a conveyor band for conveying said fillers from said platform into positions for receiving the desired eggs, means for expanding said collapsed fillers and transferring them from said platform on to said conveyor, said means comprising an endless band having projections moving in the plane of the platform and so disposed that during their movement they engage the forward edge of the filler concerned and move it in a direction causing the filler to expand and rest upon the conveyor, means for intermittently operating said conveyor to feed fillers to positions in which they can receive the desired eggs, and means whereby said filler ejecting means are operated at every second operation of said conveyor.

CHARLES NATHANIEL BARTON.